United States Patent [19]
Ek

[11] 3,946,818
[45] Mar. 30, 1976

[54] DUST CONTROLLING DEVICE FOR ROCK DRILLING

[75] Inventor: Klas Goran Gunnarsson Ek, Tyreso, Sweden

[73] Assignee: Atlas Copco Aktiebolag, Nacka, Sweden

[22] Filed: Jan. 21, 1974

[21] Appl. No.: 435,290

[30] Foreign Application Priority Data
Feb. 1, 1973  Sweden................................ 7301390

[52] U.S. Cl................. 175/209; 175/213; 15/210 B
[51] Int. Cl.².............................................. E21C 7/02
[58] Field of Search........................... 175/207–215; 15/210 B

[56] References Cited
UNITED STATES PATENTS

| | | | |
|---|---|---|---|
| 2,144,586 | 1/1939 | Kelley............................ | 175/209 X |
| 2,212,138 | 8/1940 | Wright et al...................... | 15/210 B |
| 2,654,906 | 10/1953 | Anderson.......................... | 15/210 B |
| 2,730,333 | 1/1956 | Lenhart et al..................... | 175/212 X |
| 2,883,693 | 4/1959 | Leathers et al.................. | 15/210 B |
| 3,045,769 | 7/1962 | Feucht et al...................... | 175/211 |
| 3,422,913 | 1/1969 | Young.............................. | 175/213 |
| 3,800,890 | 4/1974 | Gyongyosi et al................. | 175/209 |

FOREIGN PATENTS OR APPLICATIONS

| | | | |
|---|---|---|---|
| 549,960 | 5/1932 | Germany........................... | 175/210 |
| 589,558 | 12/1933 | Germany........................... | 175/211 |
| 325,952 | 11/1919 | Germany........................... | 175/210 |
| 256,190 | 8/1948 | Switzerland....................... | 175/209 |

*Primary Examiner*—David H. Brown
*Attorney, Agent, or Firm*—Flynn & Frishauf

[57] ABSTRACT

A dust guard intended for preventing drill dust from being spread out into the atmosphere during air flushed rock drilling. The dust guard comprises a bell-shaped suction shell which in operation is located around the drill stem at the rock surface and which is continuously discharged by a suction source. The shell is provided with a flexible collar the object of which is to hinder dust particles from leaving the shell along the drill stem. The flexible collar comprises an outer ring and a number of resilient tongues arranged in a fan-like manner between the outer ring and a central drill stem opening. The collar may be made in one piece.

12 Claims, 5 Drawing Figures

DUST CONTROLLING DEVICE FOR ROCK DRILLING

This invention relates to a dust guard intended for preventing free escape of drill dust during air-flushed rock drilling.

In particular, the invention relates to dust guard comprising a drill stem surrounding shell having a drill stem opening and an outlet opening.

A serious problem concerning such devices is to obtain an efficient and wear resistant packing for the drill stem opening.

Existing packings for this purpose are disadvantageous in that they are exposed to heavy wear from the drill stem and that they interfere with the drill stem handling. The heavy wear is due to the fact that such packings are designed to rest against the drill stem under some contact pressure to make sure that no leakage occurs. Further, such packings are designed to match the drill stem outer surface but are not flexible enough to let the drill bit through which means that those packings and the entire shell have to be dividable. Each time the drill bit is going to pass the packing, the shell has to be opened.

SUMMARY OF THE INVENTION

The present invention aims to solve these problems by introducing a flexible collar in the drill stem opening of the shell, which collar comprises an outer ring and a plurality of resilient tongues extending radially, inwardly from said outer ring leaving a central opening for the drill stem. Adjacent ones of the tongues overlap each other so as to prevent free passing of dust particles out of said shell in a direction parallel the axis of the drill stem.

BRIEF DESCRIPTION OF THE DRAWINGS

An embodiment of the invention is hereinafter described in detail with reference to the drawings in which.

DETAILED DESCRIPTION OF ILLUSTRATED EMBODIMENTS

Figure 1:
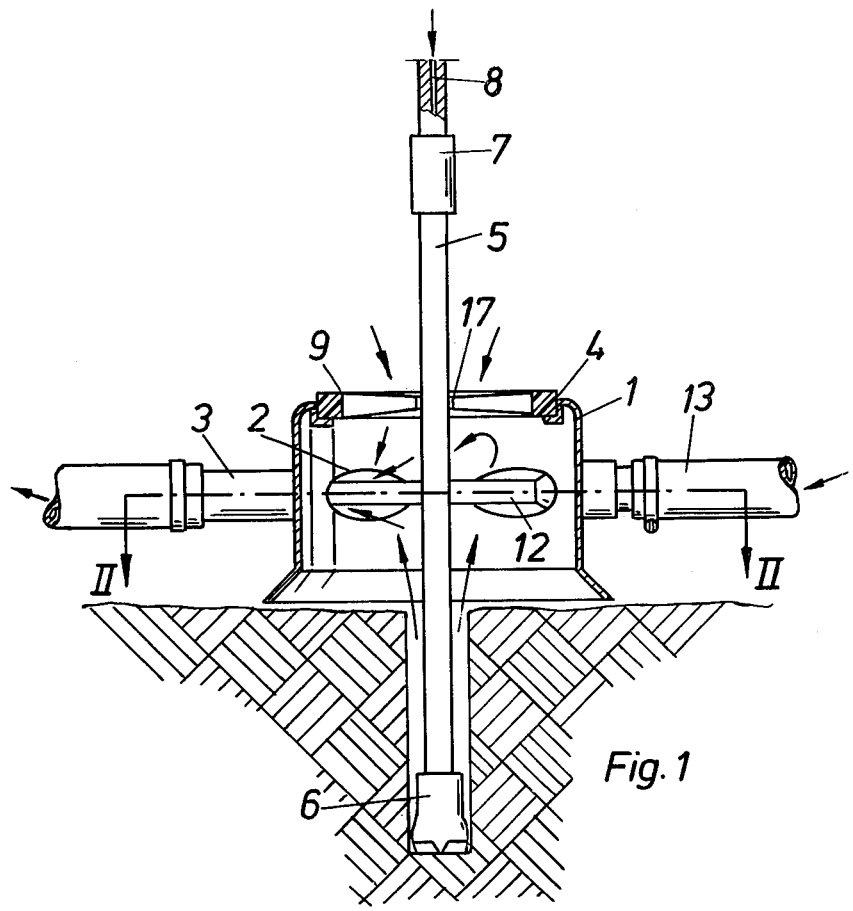
FIG. 1 shows an elevational view partly in section, of a dust guard according to the invention arranged in working position.
Figure 2:
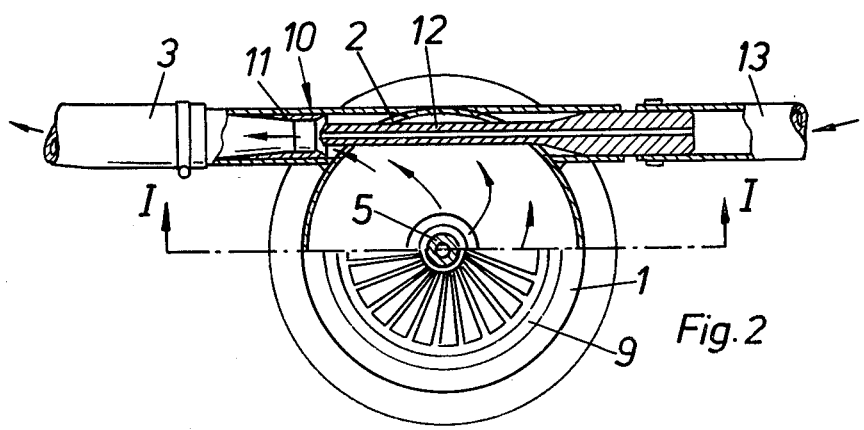
FIG. 2 shows a vertical view, partly in section, of the dust guard shown in FIG. 1, the section shown in FIG. 1 being taken along line I—I in FIG. 2 and the section shown in FIG. 2 is being taken along line II—II in FIG. 1.

The device shown in FIGS. 1 and 2 comprises a shell 1 which is fully open toward the rock surface and provided with an outlet opening 2. To the outlet opening 2 there is connected a tangentially directed outlet conduit 3. The shell 1 is also provided with an opening 4 in its upper part for receiving the drill stem 5. The drill stem 5 is provided with a drill bit 6 at its forward end and a number of sleeve joints 7. The drill stem 5 is also provided with a channel 8 through which flush air is conducted into the drill hole via a drill bit 6. In the drill stem opening 4 of the shell 1 there is mounted a collar 9 the purpose of which is to seal or screen off the drill stem opening relative to the drill stem. The collar 9 is described in detail below.

The shell 1 is drained by a suction source communicating with the outlet conduit 3. The suction source shall have overcapacity which means that it transports a greater amount of air than what is introduced through the flush air channel 8. The reason for using an overcapacity suction source is to accomplish an inwardly directed air flow through the collar 9. Some air also enters the shell through the inevitable gap between the front edge of the shell 1 and the rock surface. Thereby, drill dust is effectively prevented from leaking out of the shell into the atmosphere.

In the device shown in FIGS. 1 and 2, the suction device is located within the outlet conduit 3 itself just outside the outlet opening 2. The suction source comprises an air ejector 10 which includes a neck ring 11 and a pressure air nozzle 12 the end of which is situated within the neck ring 11. The air nozzle 12 includes a pipe which is coaxial with the outlet conduit 3 and which extends through the shell 1. The air nozzle 12 of the ejector 10 is connected to a pressure air source (not shown) through a supply conduit 13. If there is no other suitable pressure air source available, the exhaust air from the rock drill could very well be used. (However, the invention, as defined by the claims, is not limited to this particular type of suction source).

Figure 3:
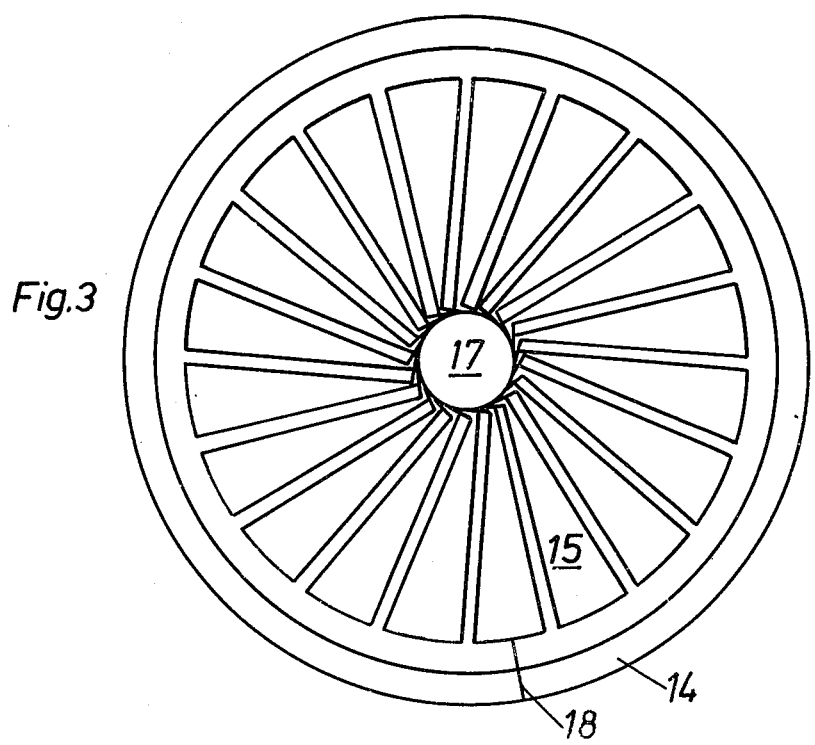
FIG. 3 shows a flexible collar according to the invention intended for sealing off the drill stem opening of the shell.

The collar 9, as clearly shown in FIG. 3, includes an outer ring 14 and a number of resilient tongues 15 which extend radially, inwardly from said ring 14 leaving a central opening 17 for the drill stem 5. The collar 9 may be formed in a single piece and is preferably made of plastic or rubber.

Figure 5:
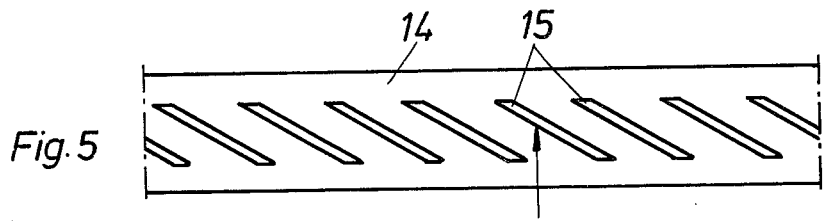
FIGS. 4 and 5 show two different views of a shape from which the flexible collar according to the invention is formed by bending.
Figure 4:
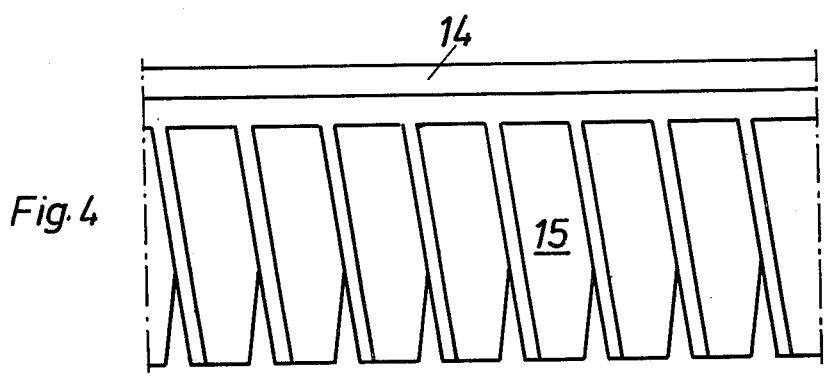

As is apparent from FIGS. 3, 4 and 5, the tongues 15 are inclined relative to the geometric plane of the outer ring 14 like the blades of a fan. The tongues are so located that they overlap each other in the axial direction of the collar 9. By this lay out, the tongues prevent free axial passage of dust particles coming out of the drill hole but permit air to enter the shell 1 in order to meet and retard these particles. By inclining the tongues 15, it is obtained not only the above mentioned over-lapping effect but also a rotation of the air that enters the shell through the collar 9. The inclination of the tongues 15 is chosen so as to give the same direction of rotation of the air within the shell as that obtained by the tangentially directed outlet conduit 3.

In FIGS. 4 and 5 there is shown a shape from which the flexible collar 9 is formed. This shape comprises an elongated sectional bar from which the tongues 15 project. The sectional bar has a determined length equal to the circumference of the drill stem opening 4 of the shell 1. To form the collar 9, the shape is bent into a circle, whereat its ends meet in a joint 18. Then, the sectional bar of the shape forms the outer ring 14 of the collar 9 (see FIG. 3). Because of the fact that the tongues 15 will be radially directed in the collar after that the shape has been bent to a circle, they may very well be tapered away from the bar. (See FIG. 4).

The operation order of the dust guard according to the invention is described below.

At the start of a drilling operation the shell 1 is placed upon the rock surface. The drill stem 5 and the drill bit 6 are lowered down through the collar 9 and the shell 1 into contact with the rock surface. When passing the collar 9, the drill bit 6 causes deflection of the resilient tongues 15. As the central hole 17 of the collar is adapted to the drill stem, the tongues 15 will reoccupy their original position after that the drill bit 6 has passed through. Before the drilling operation is started the outlet conduit 3 is connected to a dust collecting device and the pressure air supply conduit 13 is connected to a pressure air source. By introducing pressure air through the nozzle 12 a secondary air flow is created through the neck ring 11 and the outlet opening 2. This secondary air flow shall be larger than the flush air flow in order to obtain an inwardly directed air flow through the collar 9.

As the drilling operation is started and flush air is circulated through the drill hole, dust and cuttings rush out into and is trapped by the shell 1. At least adjacent the rock surface the direction of the dust particles is parallel to the drill stem 5 (see arrows in FIG. 1) but later on they are deflected and caught by the current air flow within the shell 1. However, the bigger, heavier dust particles are not deflected as easily as the smaller, lighter particles but tend to pass through the shell along the drill stem without being deflected. These particles, however, cannot pass the collar 9 without hitting the tongues 15 (illustrated by the arrow in FIG. 5). Because of the fact that the velocity of these particles is strongly reduced after hitting the collar and, because of the overcapacity of the ejector 10 which creates a counter directed air flow down through the collar 9, these particles are stopped and sucked out through the outlet opening 2. Accordingly, the collar 9 acts more like a screen than a packing.

Owing to the fact that the outlet conduit 3 is directed tangentially relative to the shell 1 and owing to the inclination of the collar tongues 15, a current air flow rotation is maintained within the shell 1. The purpose of this air rotation is to keep all dust particles suspended by the air until they leave the shell 1. Otherwise dust will settle within the shell 1 and cause choking up of the shell 1.

By forming the collar 9 by bending of an originally straight plastic or rubber shape, there is obtained an efficient as well as simple and cheap dust guard packing which can be easily and rapidly exchanged when worn out. Further, the dust guard according to the invention does not interfere with the drill stem handling because the drill bit as well as drill stem sleeve joints, if any, may pass through without opening or disassembling the shell.

The invention is not limited to the shown and described embodiment but can be freely varied within the scope of the claims.

What I claim is:

1. In a dust guard for preventing free escape of drill dust from a drill hole during air-flushed rock drilling, comprising a drill stem surrounding shell (1) provided with an outlet opening (2) and a drill stem opening (4), the drill stem opening (4) being lined with a flexible collar (9), the improvement wherein:

said flexible collar (9) comprises an outer ring (14) and a plurality of resilient tongues (15) extending radially, inwardly from said outer ring (14) leaving a central opening (17) for a drill stem (5), each of said tongues (15) having a width substantially greater than the thickness thereof and having at least a portion which is inclined relative to a plane in which said flexible collar (9) lies, at least adjacent ones of said tongues (15) commonly extending from the same outer ring (14) overlapping each other so as to prevent free passing of dust particles out of said shell between the drill stem (5) and said flexible collar (9) and between said adjacent tongues (15).

2. Dust guard according to claim 1, wherein the shell (1) is circular, an outlet conduit (3) which is tangentially directed relative to the shell (1) is provided which communicates with the outlet opening (2) for producing an air rotation within the shell (1) during drainage thereof and said tongues (15) are inclined so as to cause air that enters the shell (1) through the collar (9) to rotate in the same direction as the air rotation produced by the tangentially directed outlet conduit (3).

3. Dust guard according to claim 1, wherein said tongues (15) are inclined relative to the geometric plane of said outer ring (14).

4. Dust guard according to claim 3, wherein the shell (1) is circular, an outlet conduit (3) which is tangentially directed relative to the shell (1) is provided which communicates with the outlet opening (2) for producing an air rotation within the shell (1) during drainage thereof and said tongues (15) are inclined so as to cause air that enters the shell (1) through the collar (9) to rotate in the same direction as the air rotation produced by the tangentially directed outlet conduit (3).

5. Dust guard according to claim 1, wherein said flexible collar (9) is made of a resilient material, and said tongues (15) and said outer ring (14) are formed in one piece.

6. Dust guard according to claim 3, wherein the outer ring (14) of said collar (9) comprises an originally straight sectional bar which is bent into a circle, said tongues (15) projecting from said sectional bar and being disposed parallel to each other when said sectional bar is straight, and being spaced at such distances that they overlap each other at least at their base portions viewed in a direction perpendicular to said sectional bar.

7. Dust guard according to claim 5, wherein said tongues (15) are inclined relative to the geometric plane of said outer ring (14).

8. Dust guard according to claim 5, wherein the shell (1) is circular, an outlet conduit (3) which is tangentially directed relative to the shell (1) is provided which communicates with the outlet opening (2) for producing an air rotation within the shell (1) during drainage thereof and said tongues (15) are inclined so as to cause air that enters the shell (1) through the collar (9) to rotate in the same direction as the air rotation produced by the tangentially directed outlet conduit (3).

9. Dust guard according to claim 1, wherein the diameter of said central opening (17) of the flexible collar (9) is substantially equal to that of the drill stem (5) but smaller than the diameter of a drill bit (6) which is coupled to the drill stem and smaller than the diameter of the drill stem joints (7).

10. Dust guard according to claim 9, wherein said flexible collar (9) is made of a resilient material, and said tongues (15) and said outer ring (14) are formed in one piece.

11. Dust guard according to claim 10, wherein the shell (1) is circular, an outlet conduit (3) which is tangentially directed relative to the shell (1) is provided which communicates with the outlet opening (2) for producing an air rotation within the shell (1) during drainage thereof and said tongues (15) are inclined so as to cause air that enters the shell (1) through the collar (9) to rotate in the same direction as the air rotation produced by the tangentially directed outlet conduit (3).

12. Dust guard according to claim 10, wherein said tongues (15) are inclined relative to the geometric plane of said outer ring (14).

* * * * *